Nov. 19, 1940. M. K. SMITH 2,222,004

ELECTRIC FURNACE ROOF CONSTRUCTION

Filed Aug. 3, 1939

INVENTOR.
Miles K. Smith
By Brown, Critchlow & Flick
his ATTORNEYS.

Patented Nov. 19, 1940

2,222,004

UNITED STATES PATENT OFFICE 2,222,004

ELECTRIC FURNACE ROOF CONSTRUCTION

Miles K. Smith, Ligonier Township, Westmoreland County, Pa., assignor to Latrobe Electric Steel Company, Latrobe, Pa., a corporation of Pennsylvania Application August 3, 1939, Serial No. 288,153

2 Claims. (Cl. 13—9)

This invention relates to electric furnaces having refractory roofs, and more particularly to the cooling of their roofs.

To prolong the life of the refractory side walls of furnaces by keeping their temperature down to a point at which they are not readily eaten away by the intense heat in the furnace it has been proposed to cool the walls by embedding pipes therein and circulating a cooling liquid, such as water, through the pipes to carry away some of the heat. The extremely high temperatures to which the uncooled refractory roofs on electric furnaces are subjected usually erode or eat them away to such an extent that within relatively few heats the roofs have to be replaced by new ones. This not only is expensive, but it means that for the last few heats of a roof it is not rigid and is apt to fall into the furnace. However, when I attempted to protect the refractory roof of an electric furnace and prolong its life by embedding a cooling pipe therein in the same manner as in the side wall, I found that such a desirable object was not obtained. Instead, the roof refractory below the cooling pipe quickly spalled off and thereby reduced the thickness of the roof. This was apparently due to the extreme heat differential between cool pipe and hot refractory.

It is among the objects of this invention to overcome this disadvantage by providing an electric furnace in which the refractory roof is effectively cooled, and in which spalling and other deterioration of the roof is so retarded that its life is greatly prolonged.

In accordance with this invention an electric furnace has a refractory roof provided with a plurality of vertical openings through which electrodes extend in the usual manner. Disposed in each of these openings around the electrode therein is a water-cooled sleeve that helps keep both the electrode and adjacent portion of the furnace roof from becoming overheated. The temperature of the remainder of the roof is reduced a material amount by a conduit connected to its lower surface and adapted to be connected to a source of circulating cooling fluid, such as cold water. This conduit is preferably in the form of a pipe wound into a spiral around the group of electrodes between them and the edge of the roof in the area between the electrodes.

Figure 1:
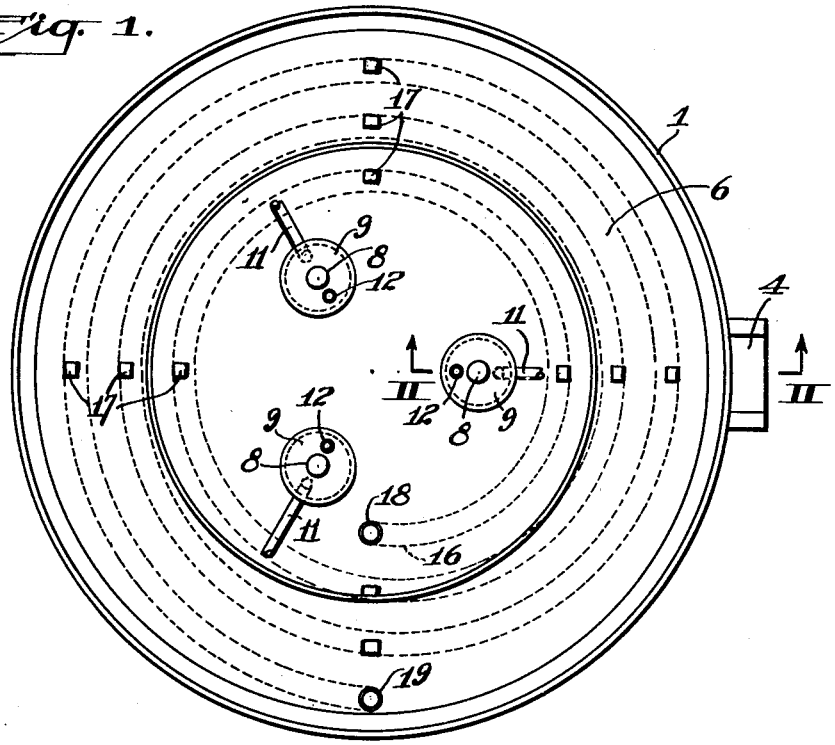
Figure 2:
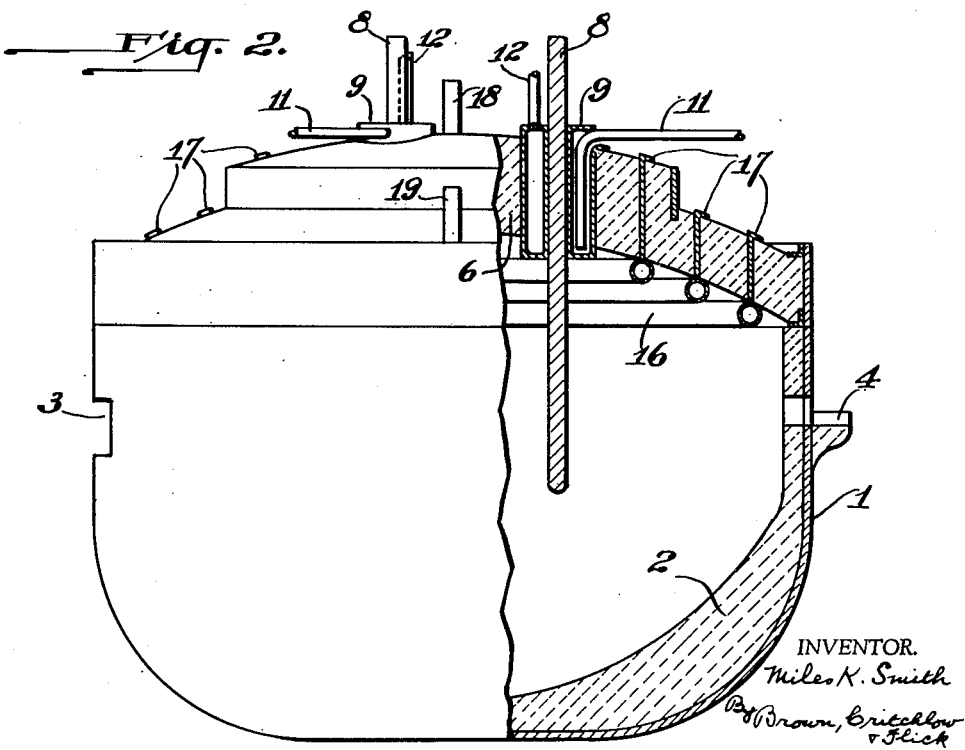

The preferred embodiment of the invention is illustrated in the accompanying drawing in which Fig. 1 is a plan view of an electric furnace incorporating my invention, and Fig. 2 is a side view broken away in section on the line II—II of Fig. 1.

Referring to the drawing, the body of an electric furnace is formed by a metal shell 1 which is circular in horizontal cross section and which contains a refractory lining 2. One side of the furnace is provided with a charging opening 3 and the other side with a pouring spout 4 for the metal melted therein. The top of the furnace is closed by a removable dome-like roof 6 made of suitable refractory material in monolithic form or from a plurality of refractory blocks wedged together in the usual way. The central portion of the roof is provided with a plurality of vertical openings, three being shown in the drawings, each of which receives a vertical electrode 8 that projects down into the furnace. Surrounding each electrode in the roof opening is a hollow sleeve 9 connected to inlet and outlet pipes 11 and 12, respectively, through which water or other cool material is circulated so as to cool the electrode and the immediately surrounding portion of the furnace roof.

It is a feature of this invention that the remainder of the roof likewise is cooled so that it will last much longer than otherwise. Accordingly, a pipe 16, preferably wound into spiral form, is positioned immediately below the bottom of the roof around the electrodes in the space between them and the edge of the roof. Although the pipe may be connected to the roof in any suitable manner, it is preferred to hold it against the roof's lower surface by connecting it to the lower ends of metal straps 17 that extend upwardly through the roof with their upper ends bent over the top of the roof for holding them in place. The two ends 18 and 19 of the pipe 16 project up through the roof and are adapted to be connected to a source of circulating cooling fluid, such as cold water, by which the roof is cooled to a temperature that materially retards spalling and erosion by the intense heat within the furnace. The pipe should be of such size and length that the water can be circulated through it before being heated to the boiling point by the heat absorbed from the furnace. In some cases this may necessitate several inlets and outlets.

Due to the cooling pipe being attached to the bottom of the roof, rather than being embedded in it, there is no roof refractory below the pipe to spall off on account of the temperature differential between pipe and roof. The exposed cooling pipe also more effectively reduces the temperature of the entire area within the furnace above the molten metal, and thereby likewise prevents rapid spalling and eating away of the refractory side wall above the metal. As an example of the effectiveness of this invention, an ordinary refractory roof on a certain type of electric arc furnace lasts from about fourteen to twenty heats, but such a roof protected by a cooling pipe in the manner disclosed herein has run eighty-four heats and will probably continue for one hundred heats or more because it is still in very good condition.

According to the provisions of the patent statutes I have explained the principle and mode of operation of my invention, and have illustrated and described what I now consider to represent its best embodiment. However, I desire to have it understood that, within the scope of the appended claims, the invention may be practiced otherwise than as specifically illustrated and described.

I claim:

1. In an electric furnace, a refractory roof provided with a plurality of vertical openings therethrough, an electrode disposed in each opening, and a pipe in the form of a spiral surrounding said plurality of openings and mounted against the lower surface of the roof between said openings and the side wall of the furnace, said pipe being adapted to be connected to a source of circulating cooling fluid whereby to reduce the temperature of said roof and prolong its useful life.

2. In an electric furnace, a refractory roof provided with a plurality of vertical openings therethrough, an electrode disposed in each opening, a water-cooled sleeve surrounding each electrode in its surrounding opening, and a spirally wound pipe encircling said electrodes and connected to the bottom of the roof, said pipe being adapted to be connected to a source of circulating cooling fluid to reduce the temperature of said roof and materially retard its erosion.

MILES K. SMITH.